United States Patent
McNaney

[11] 4,032,220
[45] June 28, 1977

[54] LIGHT OPTIC DATA HANDLING SYSTEM

[76] Inventor: Joseph T. McNaney, 8548 Boulder Drive, La Mesa, Calif. 92041

[22] Filed: Mar. 1, 1976

[21] Appl. No.: 662,848

[52] U.S. Cl. .......................... 350/161 W; 350/96 C
[51] Int. Cl.² ........................................... G02F 1/34
[58] Field of Search ........... 350/161, 96 C, 96 WG; 331/94.5 M

[56] References Cited
UNITED STATES PATENTS

| | | | |
|---|---|---|---|
| 3,790,898 | 2/1974 | Gudmundson et al. | 350/161 W |
| 3,919,669 | 11/1975 | Hartemann | 350/161 W |
| 3,960,440 | 6/1976 | McNaney | 350/161 W |

Primary Examiner—William L. Sikes

[57] ABSTRACT

The system herein includes light optic means which functions as light beam distributor in making available, almost instantly, one or more of a plurality of input light beams at any of a plurality of differently positioned output paths of the system as opposed to the more well known line scan beam deflection systems. The input beams may be from individual laser sources of radiant energy, each providing a different color of light, whereupon light from these sources may be combined and directed along a common output path.

11 Claims, 4 Drawing Figures

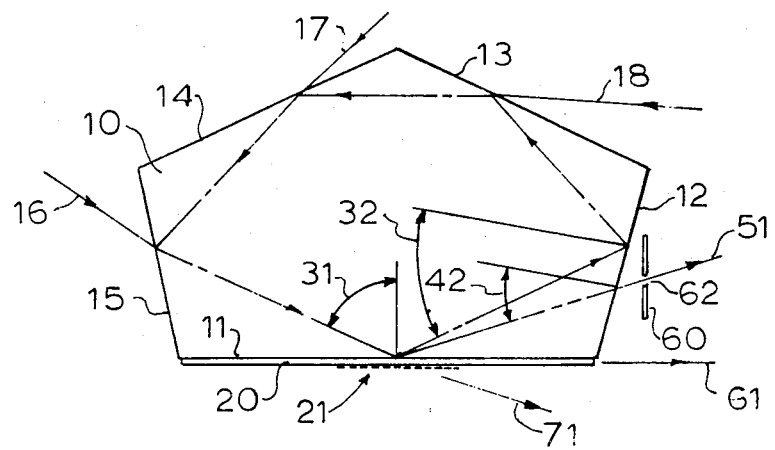
FIG. 1
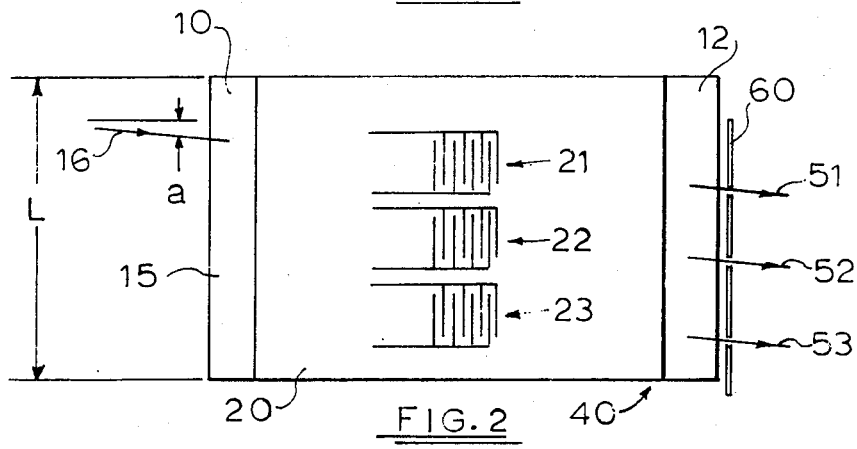
FIG. 2
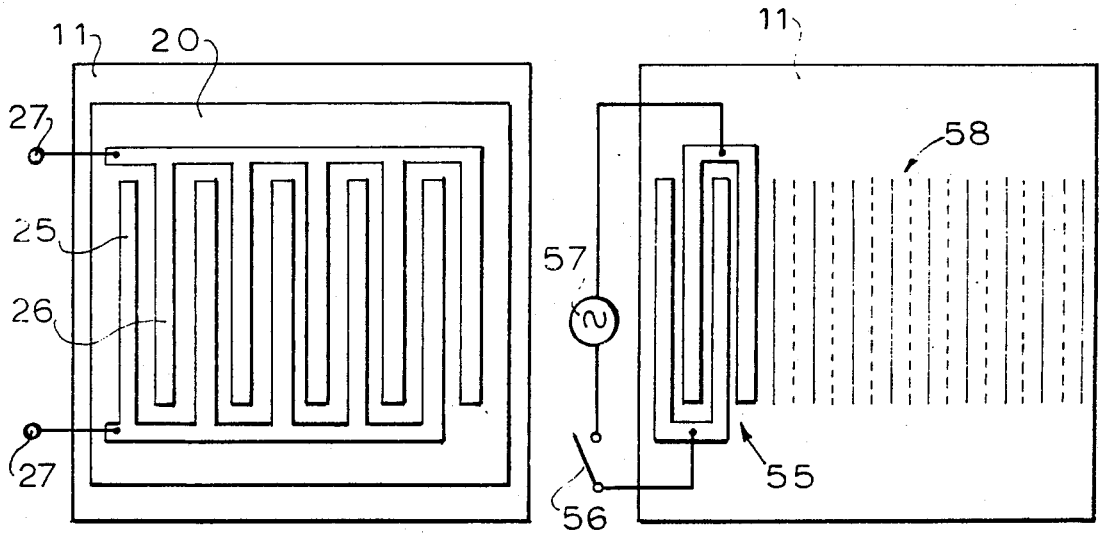
FIG. 3
FIG. 4

LIGHT OPTIC DATA HANDLING SYSTEM

SUMMARY OF THE INVENTION

Individual beams of light, each preferably from a laser source of light, which can be in the form of radiant energy extending from ultraviolet, through the visible spectrum, to infrared, are directed along individual input paths toward light admitting surfaces of the data handling system of the invention. Upon entering the system the light is directed along, what will be referred to as, primary optical paths of the system. In following such a path a beam of light undergoes a series of light reflections which cause the beam to spiral its way through a length dimension of the system so as to make available light thereof at any of a number of output positions extend along the length dimension of the system. By means of controllable OFF or ON conditioned light reflection control means supported in an optical control relationship to each of the output positions light from one beam or a combination of two or more beams, may be directed, selectively, along secondary paths stemming from the output positions. Light output from the system can be used in communications, color video presentations, computer information display or recording, or for the control purposes. It is, however, an object of the invention to extend the resolution, deflection and light beam control capabilities beyond those of present day light beam handling system means.

The invention is illustrated, by way of example only, in the accompanying drawings, and the description which follows when read in connection with the drawing will provide a better understanding of these and other objectives and advantages of the invention.

BRIEF DESCRIPTION OF THE DRAWING

FIGS. 1 and 2 show first and second views, diagrammatically illustrated, of the light reflecting and control means of the invention;

FIGS. 3 and 4 are diagrammatic presentations, respectively, of first and second light reflection control means that may be included in the invention.

DESCRIPTION OF THE INVENTION

Referring to FIGS. 1 and 2, the partly schematic views of the invention are designed to show a member 10, which will be referred to as a light beam distributor, but exemplified, as being in the form of a solid member of light conducting material and it therefore will also be preferred to as a light guide 10, having a length dimension L. In certain embodiments of the invention the guide 10 material may be quartz, tourmaline, barium titanate, lithium niobate, or still that of other materials exhibiting piezoelectric effects, Kerr effects, or Pockels effects. In other embodiments the guide 10 material may be of a light conducting glass, plastic, or the like. The light guide member 10 is exemplified as having five light reflecting surfaces 11, 12, 13, 14 and 15, each having a length dimension L. The surfaces 13, 14 and 15 will each be referred to, also, as light input surfaces, the surface 11 will be referred to as a light reflection control surface, and the surface 12 will be referred to as a light output surface. Light will be directed along an input path 16 from a laser source, not shown, at an angle $a$, as indicated in FIG. 2. Light will also be directed along input paths 17 and 18, respectively, form two additional laser sources each at a similar angle $a$, but not shown.

In each case light from the laser source will be a well collimated beam of light and compensated for refraction upon entering the light guide 10. Upon entering the guide the light of each beam will be directed along, what will be referred to as, a primary optical path by means of the light reflecting surfaces 11, 12, 13, 14 and 15. Each beam, in effect, spirals its way through the length L of the guide 10, thereby following a series of 360° optical paths, each displaced one with respect to the other in a side-by-side relationship. Each of the light reflecting surfaces are optically related one with respect to the other and with respect to each of the input paths 16, 17 and 18 whereby the beams from along each of the input paths will appear at each of a series of predetermined potential secondary light reflecting positions along the length L of the guide 10; said positions extending along the length of the surface 11.

The surface 11 has deposited thereon a thin layer, about 1-micron thickness, of light conducting material 20, and upon the outer surface thereof there is shown a series of individual interdigital electrode structures 21, 22 and 23, each of which are drawn greatly enlarged, and also limited to a showing of but three, so as to simplify the description of the invention. The position of each of the electrode structures will coincide, respectively, with each of the predetermined potential secondary light reflecting positions at which each of the input beams will be available for a controlled redirecting of light along secondary paths stemming therefrom. One such electrode structure is further illustrated in FIG. 3, showing each to be comprised of electrodes 25 and 26 and terminals 27 to which an electrical potential will be connected.

In describing the operation of the invention the ue of a material exhibiting piezoelectric effects in a light guide 10 will be considered, and the layer 20 understood as being a film of glass. The light guide 10 material will be considered as having an index of refraction of 1.66, supported in an atmospheric air environment. The glass film 20 presents an index of refraction of 1.55. Light entering the guide 10 from along the path 16 will be incident on the interface 11 of the guide 10 and film 20 materials at an angle 31 of 66°, then totally reflected therefrom at the same angle toward the interface 12 and incident thereon at an angle 32 of 38°. Light entering the guide 10 from along the path 17 will follow the primary path toward the interface 15, reflected therefrom toward the interface 11 and will be incident thereon at the angle 31 of 66°, then totally reflected therefrom at the same angle toward the interface 12 and incident thereon at the angle 32 of 38°. Light entering the guide 10 from along the path 18 will follow the primary path toward the interface 14, reflected therefrom toward the interface 15, reflected therefrom toward the interface 11 and will be incident thereon at the angle 31 of 66°, then reflected therefrom at the same angle toward the interface 12 and incident thereon at the angle 32 of 38°. Having reached the interface 12 each of the three light beams will continue along the primary path, being reflected at the interface 13, then at the interface 14, then at 15, then again 11, and so on, until having spiralled their way through the guide 10 at the opposite end 40 thereof.

The object of noting the use of a light guide 10 material having an index of 1.66 is that the critical angle insofar as light being reflected at the interface 12 is concerned is 27°, which angle is at least lower than the angle 32 of 38°. The latter is the angle at which light stemming from the three input beams will be incident on the interface 12 and thereupon reflected therefrom so as to continue their spiral through the guide 10. Still other indices for the light guide material can of course be considered while still meeting the light reflecting requirements of the system.

Upon the application of an electrical potential to the terminals 27 of the electrodes 25 and 26 a voltage difference between these interdigital electrodes generates a periodic strain in the guide 10 material. A resulting electric field extends through the thickness dimension of the film 20 to the piezoelectric effect guide 10 material. By reason of elasto-coupling the periodic strain extends into the thickness dimension of the film 20 establishing spatial modulation of index of refraction of the guide and film materials at the interface thereof. This serves as a diffraction grating which interferes with a total reflection of the light incident thereon and to the extent of allowing such light to be directed away from an otherwise normal primary optical path. In view of the foregoing considerations the normal angle of 66° light reflection at the guide/film interface 11 can be increased, for example, sufficiently greater than the 66° so as to establish an angle 42 which is below the critical angle of light incident on the guide/air interface 12. At such angle 42 the reflecting of the light will be frustrated, resulting in a passing of light through the guide/air interface 12 and along a secondary path 51. Or, in response to an appropriate voltage to the electrode terminals 27, light can be made to enter the film and thereupon be directed along still another secondary path 61. Or, in response to still another control voltage condition light can be made to pass through the guide/film interface 11 and thereupon along still another secondary path 71. Each of the output paths, 51, 61 or 71, are related to, and thereby stem from, light reflection control positions of the guide 10 adjacent, respectively, electrode structures 21, 22 and 23 shown in FIG. 2. In FIG. 2, however, the showing of output paths has been limited to those passing through the guide/air interface 12, namely, paths 51, 52 and 53 which correspond, respectively, to output positions of electrodes 21, 22 and 23.

An alternative to the use of a piezoelectric effect material in the form of light guide 10, the film 20 can be of such material and the guide 10 may be of a glass or plastic material. Although the exact manner in which a light diffracting grating is established at the guide/film interface 11 will differ the light control effects will be similar. Acousto-optic means, as illustrated in FIG. 4, may also be considered as still another method whereby the spatial modulation of the refractive index of materials coincident with the interface 11 can be established. A transducer means 55, for example, will be energized through a switch means 56 by an appropriate voltage from a source 57 so as to establish a proprigating of acoustic waves 58 at the surface 11 of the light guide.

A light masking means 60 is positioned in the way of the output, or secondary, paths 51 provided with openings 62 therein through which light along any of these paths can pass. The number and the center-to-center spacing of these openings correspond to the number and the center-to-center spacing of the reflection control positions 21, 22, 23, etc., along the length of the guide. Spot size portions of light directed along the secondary paths, which can include light from along one or more of the input paths 16, 17 and 18, can be utilized, for example, in information display applications. A modulating, or an ON and OFF control, of light directed along the input paths may be accomplished by any of a number of means known in the arts and therefore not included in the drawing. And, of course, light of different colors can be used, such as red light along path 16, green light along path 17, and yellow light along path 18. A combining of such light will take place at any of the number of light reflection control positions 21, 22, 23, etc. Therefore, an object of the invention is to optically align two or more light beams with one another along any one of a plurality of output paths of the system for utilization in information display applications and light optic data handling systems in general. In display applications the spot size and spacing of the holes 62 in the mask 60 will be directly related to the resolution capabilities of the system.

It should be understood by those skilled in the arts pertaining to the construction and application possibilities of the invention herein set forth that the embodiments included herein illustrate in a very limited sense the usefulness of the invention, and that the invention includes other modifications and equivalents as they may be seen by those skilled in the arts, but still being within the scope of the appended claims.

I claim:

1. Light beam distributor and reflection control means, comprising:

a. at least first and second light admitting surfaces:

b. at least first and second sources of light;

c. means for directing light from said first and second sources along corresponding first and second input paths and, respectively, toward said first and second admitting surfaces and thereupon along a primary optical path within said distributor while undergoing a series of light reflections therein so as to establish an availability of light from said first and second sources at a plurality of predetermined light output positions of said distributor for an optically controlled redirecting of light along a selected one of a plurality of secondary paths stemming from said output positions;

d. said means for directing the light along said primary path including an array of light reflecting interfaces of first and second light conducting media presenting, respectively, first and second indices of refraction, each of said interfaces presenting a length dimension and each angularly oriented so as to establish an optical relationship one with respect to the other, with respect to said input paths, and with respect to said secondary paths, said array of interfaces providing a series of 360° primary optical paths for said light, each said 360° path displaced one with respect to the other in a side-by-side relationship in the direction of said length dimension;

e. said output positions extended along said length dimension coincident with a predetermined one of said interfaces of first and second light conducting media of said array of interfaces;

f. light reflection control means positioned along said length dimension for effecting, selectively, a redirecting of light of said first and second sources along a secondary path stemming from a corresponding output position thereof.

2. The invention as set forth in claim 1, wherein said light reflection control means is positioned along said length dimension adjacent said one interface.

3. The invention as set forth in claim 1, wherein said light reflection control means is positioned along said length dimension adjacent an interface of first and second light conducting media preceding said one interface.

4. The invention as set forth in claim 2, wherein said light reflection control means includes an interdigital electrode structure having terminals for connecting a voltage thereto for establishing periodic variations of index of refraction in said first and second media coincident with said one interface.

5. The invention as set forth in claim 2, wherein said light reflection control means includes an acoustic wave generator having terminals for connecting a voltage thereto for establishing periodic variations of index of refraction in at least one of said first and second media coincident with said one interface.

6. The invention as set forth in claim 3, wherein said light reflection control means includes an interdigital electrode structure having terminals for connecting a voltage thereto for establishing periodic variations of index of refraction in said first and second media coincident with the interface preceding said one interface.

7. The invention as set forth in claim 3, wherein said light reflection control means includes an acoustic wave generator having terminals for connecting a voltage thereto for establishing periodic variations of index of refraction in at least one of said first and second media coincident with the interface preceding said one interface.

8. The invention as set forth in claim 1 additionally including:
 g. a light mask having a plurality of window means therein:
 h. each said window means positioned in the way of light stemming from said output positions so as to effect a limiting of the passage of light along said secondary path.

9. The invention as set forth in claim 1, wherein said first and second sources of light provide, respectively, first and second wave lengths of radiant energy.

10. Light beam reflection control system comprising:
 a. an array of at least first, second and third light admitting surfaces;
 b. at least one light output control surface;
 c. at least first, second and third individual sources of light;
 d. means for directing light from said first, second and third sources of light along corresponding first, second and third input paths, respectively, toward said first, second and third admitting surfaces;
 e. each admitting surface of said array of surfaces including an interface of first and second light conducting media presenting, respectively, first and second indices of refraction, said array of surfaces angularly oriented so as to establish an optical relationship one with respect to the other and with respect to said output control surface;
 f. means for directing light incident upon said first, second and third admitting surfaces simultaneously along a common primary optical path within said system so as to establish an availability of a combination of light from said first, second and third sources of light at said output control surface for an optically controlled redirecting of said light therefrom.

11. The invention as set forth in claim 10 additionally including light reflection control means, operatively associated with said output control surface, for effecting a redirecting of light away from said primary path to and along a secondary path stemming from said control surface, said secondary path extending beyond the light reflecting limits of said light beam reflection control system.

* * * * *